United States Patent [19]

Kazuse et al.

[11] Patent Number: 4,590,098

[45] Date of Patent: May 20, 1986

[54] PROCESS FOR PRODUCING COMPOSITE MEMBRANE

[75] Inventors: Yoshitaka Kazuse; Akio Iwama; Shinichi Chikura, all of Osaka, Japan

[73] Assignee: Nitto Electric Industrial Co., Ltd., Osaka, Japan

[21] Appl. No.: 663,748

[22] Filed: Oct. 23, 1984

[30] Foreign Application Priority Data

Oct. 27, 1983 [JP] Japan ................... 58-202450

[51] Int. Cl.$^4$ .............................. B05D 5/00
[52] U.S. Cl. ................... 427/244; 428/218; 428/473.5; 428/447
[58] Field of Search ............ 427/244; 428/218, 473.5, 428/447

[56] References Cited

U.S. PATENT DOCUMENTS

| | | | |
|---|---|---|---|
| 3,925,211 | 12/1975 | Schumann et al. | 264/41 |
| 4,333,897 | 6/1982 | Hayashi et al. | 425/4 R |
| 4,358,378 | 11/1982 | Iwama et al. | 264/41 |
| 4,385,084 | 5/1983 | Iwama et al. | 264/41 |
| 4,474,858 | 10/1984 | Makino et al. | 521/61 |

FOREIGN PATENT DOCUMENTS 2011804 7/1979 United Kingdom .

*Primary Examiner*—Joseph L. Schofer
*Assistant Examiner*—N. Sarofim
*Attorney, Agent, or Firm*—Sughrue, Mion, Zinn, Macpeak & Seas

[57] ABSTRACT

A process for producing a composite membrane is disclosed. The composite membrane is produced by bringing an organic solution of a specific cross-linkable silicone resin into contact with the surface of a dense layer of an anisotropic membrane made of a polyimide resin. The composite membrane is useful for separation of an organic solution containing a relatively small solute, liquid/liquid separation by pervaporation method, and concentration and separation of gases.

11 Claims, 1 Drawing Figure

U.S. Patent May 20, 1986 4,590,098
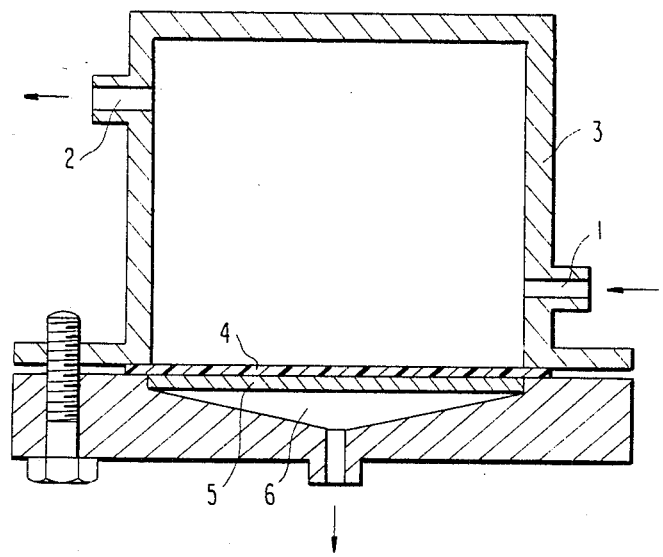

PROCESS FOR PRODUCING COMPOSITE MEMBRANE

FIELD OF THE INVENTION

The present invention relates to a process for producing a composite membrane. More particularly, it is concerned with a process for producing a composite membrane suitable for use in membrane separation of an organic solution containing a relatively small solute having a molecular weight of from several tens to several thousands, liquid/liquid separation by the pervaporation method, and concentration and separation of gases.

BACKGROUND OF THE INVENTION

For selective separation or removal of a specific component contained in a liquid or gas mixture, a separation method utilizing a membrane has received increasing attention in recent years. This has already been put to practical use in several fields. For example, it is known that a membrane made of a silicone resin is effective in separating an organic component, i.e., a low molecular weight organic compound such as methanol, ethanol, propanol or acetone from an aqueous solution containing the organic compound, or in separation and concentration of oxygen in air. One of the reasons is that a silicone resin exhibits a high selective permeability for a specific organic compound since its surface tension is small as compared with that of the conventional organic resins and its intermolecular force is small. Another reason is that of various resins, the silicone resin has the highest coefficient of permeation for oxygen and nitrogen, for example. Membranes made of polydimethyl siloxane, polydiphenyl siloxane, polyvinyl trimethyl siloxane, and the like have heretofore been known.

Membranes made of such silicone resins, however, generally have a poor mechanical strength. In practical membrane separation, therefore, it is necessary for the thickness of the membrane to be increased to more than 100 $\mu$m. On the other hand, the permeation flux of a membrane is in inverse proportion to its thickness. Therefore, although the silicone membranes have a high coefficient of permeation for organic compounds and gases, they suffer from a problem that a permeation flux is small, which is a factor determining economic efficiency in the membrane separation.

In order to overcome the above problem, it has already been proposed to form a thin film of a silicone resin on a porous substrate made of an organic polymer such as polysulfone and polyacrylonitrile to thereby increase the mechanical strength of the silicone resin membrane and also to increase the permeation flux by reducing its thickness as described, for example, in Japanese Patent Application (OPI) Nos. 86684/78 and 82380/79 (the term "OPI" as used herein refers to a "published unexamined Japanese patent application"). In forming a silicone resin thin film on such a porous substrate, it is necessary that an organic solution of the silicone resin be coated and then the solvent be evaporated. Since, however, such a porous substrate generally has a poor resistance to organic solvents, organic solvents which can be used in preparation of the silicone resin solution are limited to aliphatic hydrocarbon solvents having a low dissolving power, such as hexane or heptane. Furthermore, these aliphatic solvents merely dissolve silicone resins having a low molecular weight. Therefore, the mechanical strength of a silicone resin film formed on a substrate is not sufficiently high and its thickness is still considerably large. In other words, a silicone resin having a molecular weight of 10,000 or more, which is desirable to use in preparation of a thin film having a high mechanical strength, is soluble only in organic solvents having a high dissolving power, such as toluene, ethyl acetate or methyl ethyl ketone, and a solution of the silicone resin in such an organic solvent cannot be coated on the above-described porous substrate.

For separation of an organic liquid mixture, a semipermeable membrane made of an aromatic polyimide resin and a semipermeable membrane made of a polyimide resin prepared by condensation of 1,2,3,4-butanetetracarboxylic acid or its derivative and an aromatic diamine have been proposed and put to practical use. Solutes which can be separated by such a polyimide resin semipermeable membrane are limited to those having a molecular weight of several thousands or more and as a result, such a polyimide resin membrane cannot be applied to a reverse osmosis permitting the separation of a solute having a relatively small molecular weight of from several tens to several thousands, or to a membrane separation in the intermediate range between reverse osmosis and ultrafiltration.

SUMMARY OF THE INVENTION

The present invention is intended to overcome the above-described various problems.

An object of the present invention is to provide a process for producing a composite membrane suitable for use in membrane separation of an organic solution containing a low molecular solute having a molecular weight of from several tens to several thousands, pervaporation method for separation of a low molecular weight organic compound such as methanol, ethanol, propanol or acetone, from an aqueous solution containing the organic compound, and separation of a gas mixture such as separation of oxygen from nitrogen in the air.

Another object of the present invention is to provide a process for producing a composite membrane which comprises:

bringing an organic solution of a cross-linkable silicone resin into contact with a dense surface layer of a polyimide resin anisotropic membrane comprising a dense surface layer and a porous layer continuously connected to the dense surface layer, and cross-linking the silicone resin to form the cross-linked silicone resin thin film on the dense surface layer of the anisotropic membrane.

Further object of the present invention is to provide a process for producing a composite membrane which comprises:

contacting an organic solution of a cross-linkable silicone resin with a dense surface layer of a polyimide resin anisotropic membrane comprising a dense surface layer and a porous layer continuously connected to the dense surface layer, cross-linking the silicone resin to form the cross-linked silicone resin thin film on the dense layer of the anisotropic membrane, and irradiating the thin film with electromagnetic waves to increase the cross-linking density.

BRIEF DESCRIPTION OF THE DRAWING

The FIGURE is a cross-sectional view of an apparatus used in measurement of the membrane performance of a composite membrane produced by the present invention.

DETAILED DESCRIPTION OF THE INVENTION

The polyimide resin which constitutes the anisotropic membrane used in the present invention consists essentially of a repeating unit represented by the formula:

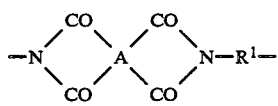  (I)

wherein A is a tetravalent aliphatic or aromatic group, and $R^1$ is a divalent organic group comprising an aromatic, alicyclic or aliphatic hydrocarbon, or a divalent organic group comprising the above hydrocarbon groups linked with a divalent organic linking group.

Particularly preferred polyimide resin is a polyimide resin having a repeating unit represented by the formula:

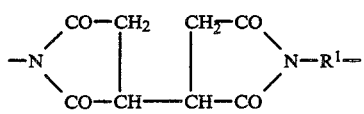  (II)

wherein $R^1$ is the same as defined above.

The intrinsic viscosity, $[\eta]$, of the polyimide resin is preferably from 0.5 to 2, more preferably from 0.7 to 1.1. The intrinsic viscosity as used herein is determined at 30° C. in an N-methyl-2-pyrrolidone solution. If the intrinsic viscosity is too small, the polyimide resin is inferior in membrane-forming ability. On the other hand, if it is too large, the polyimide resin is only sparingly soluble in an organic solvent, resulting in deterioration of the membrane-forming workability.

As is conventionally known, an anisotropic membrane of a polyimide resin has an anistropic structure such that a dense surface layer is supported by a porous layer in one body. Anisotropic membranes having ultrafiltration performance can be produced by, for example, the methods described in Japanese Patent Application (OPI) Nos. 152507/80 and 139104/81.

Anisotropic ultrafiltration membranes made of polyimide resins consisting essentially of repeating units represented by the following formulae:

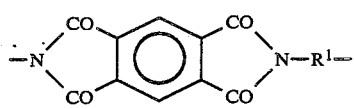  (III)

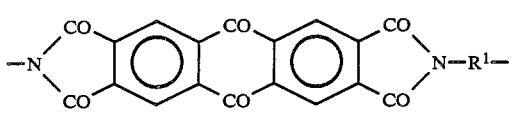  (IV)

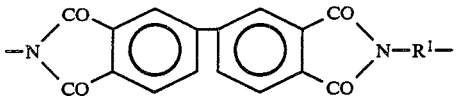  (V)

wherein $R^1$ is the same as defined above, can also be preferably used.

Ultrafiltration membranes having an anisotropic structure which are made of these polyimide resins are alrady known and can be produced by, for example, the methods described in H. Strathmann, *Desalination*, 26, 85 (1978) and U.S. Pat. No. 3,925,211. These polyimide resins are usually insoluble in a solvent. Therefore, polyamic acid which is a precursor of the polyimide and is soluble in a solvent is applied and shaped into a membrane and, thereafter, it is ring-closed by heating or a suitable chemical procedure to convert into the corresponding polyimide resin. In the present invention, for the same reason as described above, it is preferred to use polyamic acid having an intrinsic viscosity $[\eta]$ falling within the range of from 0.5 to 5.

In the above formulae, $R^1$ is a divalent aromatic, alicyclic or aliphatic hydrocarbon group, or a divalent organic group comprising the above hydrocarbon groups linked with a divalent organic linking group.

Examples of the aliphatic group include a straight or branched alkylene group having from 1 to 20 carbon atoms.

Examples of the alicyclic group include a cycloalkylene group having from 5 to 12 carbon atoms which may be substituted with an alkyl group.

Examples of the aromatic group include a phenylene group and a naphthylene group, each having from 6 to 12 carbon atoms, which may be substituted with an alkyl group.

In addition, $R^1$ may be a divalent organic group comprising the above divalent hydrocarbon groups linked with a divalent organic linking group. Examples of such divalent organic linking groups are $-CH_2-$, $-C(CH_3)_2-$, $-O-$, $-S-$, $-SO_2-$, $-CO-$,

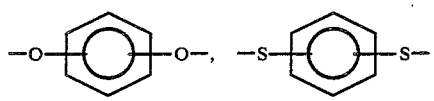

and $-Si(CH_3)_2-$.

For the anisotropic membrane of the above polyimide resin so as to have a superior resistance against organic solvents, it is preferred that $R^1$ be a divalent aromatic hydrocarbon group or a divalent aromatic group comprising at least two aromatic hydrocarbon groups linked together through an organic linking group as described above. Preferred examples of such aromatic groups are

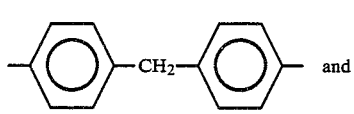 and

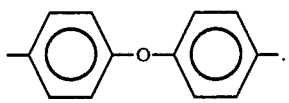

In the present invention, the above polyimide resin semipermeable membrane preferably has a molecular weight cut-off of from 1,000 to 100,000, more preferably from 20,000 to 50,000. If the anisotropic membrane has the molecular weight cut-off of less than 1,000, the permeation flux of the ultimate composite membrane is not sufficiently large. On the other hand, if the molecular weight cut-off is more than 100,000, the cross-linkable silicone resin permeates into the membrane at the time of formation of a thin film as described hereinafter, thereby forming a dense silicone resin layer having a three dimensional net-like structure in the membrane. This results in a substantial increase in the thickness of the dense layer and also a decrease in permeation flux.

The molecular weight cut-off can be determined by measuring the rejection of a given anisotropic membrane to a solute having a known molecular weight. In the present invention, a toluene solution containing as a solute 5,000 ppm of polyethylene glycol having a monodisperse molecular weight distribution is applied onto the surface of the membrane at a temperature of 25° C. under a pressure of 2 kg/cm², and the molecular weight of polyethylene glycol having the rejection of at least 90% is referred to as a molecular weight cut-off of the membrane.

An anisotropic membrane having such a molecular weight cut-off is generally called an ultrafiltration membrane in liquid separation. In the present invention, it is sometimes called an ultrafiltration membrane in place of the anisotropic membrane. The above anisotropic membrane is used either as a dry membrane or as a glycerin-containing dry membrane.

The term "cross-linkable silicone resin" as used herein means a silicone resin which is soluble in organic solvents before cross-linking and is cross-linkable at room temperature by moisture, for example, in air but, when cross-linked, provides an organic solvent-insoluble resin.

A cross-linkable silicone resin which is more preferably used in the present invention is three or more functional organopolysiloxane represented by the formula (a):

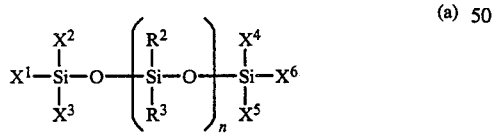

wherein $X^1$, $X^2$, $X^3$, $X^4$, $X^5$ and $X^6$ each is a monovalent organic group with proviso that at least three groups thereof each is a reactive group selected from the group consisting of an acyloxy group, an alkoxy group, a ketoxime group, an alkyl-substituted amino group and an amide group, $R^2$ and $R^3$ each is an organic group selected from the group consisting of an alkyl group, a halogenated alkyl group, a vinyl group and an aryl group, and n is an integer of from 400 to 1,000.

In the above organopolysiloxane, $X^1$ to $X^6$ each is a monovalent organic group and at least three of $X^1$ to $X^6$ present at both terminals of the molecule are independently hydrolyzable reactive groups selected from the group consisting of an alkoxy group such as a methoxy group or an ethoxy group, an acyloxy group such as an acetoxy group, a ketoxime group such as a methyl ethyl ketoxime group or a dimethyl ketoxime group, an alkyl-substituted amino group such as a diethylamino group, and amide group.

Monovalent organic groups other than the above reactive groups include an alkyl group, a vinyl group, an aminoalkyl group, an epoxyalkyl group, a chloroalkyl group and an aryl group.

$R^2$ and $R^3$ each is an organic group selected from the group consisting of an alkyl group having from 1 to 9 carbon atoms, a halogenated alkyl group, a vinyl group and an aryl group. Preferred examples thereof are a methyl group, an ethyl group, a fluoroalkyl group, a vinyl group, a phenyl group, and the like.

The repeating unit of the formula (a) may be partially replaced by

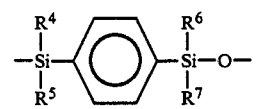

wherein $R^4$, $R^5$, $R^6$ and $R^7$ are the same as defined for $R^2$ and $R^3$.

Representative examples of such organopolysiloxanes are shown below.

Alkoxy Organopolysiloxanes:

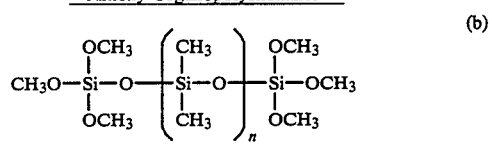
(b)

Ketoxime Organopolysiloxanes:

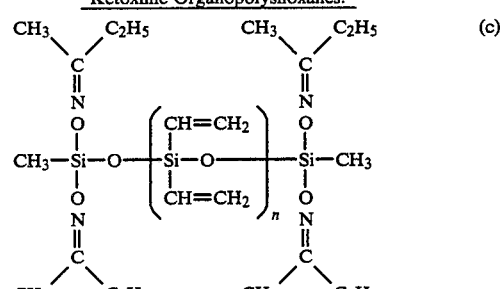
(c)

Acyloxy Organopolysiloxanes:

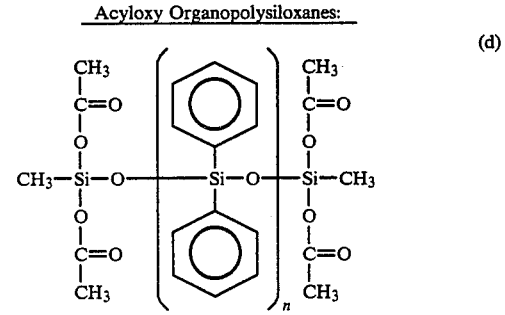
(d)

Amino Organopolysiloxanes:

-continued

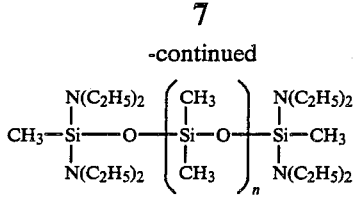
(e)

Amide Organopolysiloxanes:

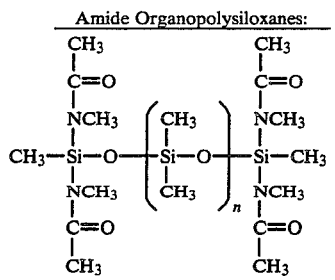
(f)

In bringing the organic solution of the cross-linkable silicone resin into contact with the surface of the dense layer of the anisotropic membrane made of the polyimide resin, if the resin permeates in the inside of the anisotropic membrane and is cross-linked therein, a dense silicone resin layer is also formed in the membrane. As a result, there is a danger that the thickness of the dense layer is substantially increased. In the present invention, therefore, it is preferred that the average molecular weight of the cross-linkable silicone resin is equal to or greater than the molecular weight cut-off of the polyimide resin anisotropic membrane. Thus, the cross-linkable silicone resin is chosen so as to satisfy the above requirements, taking into consideration the molecular weight cut-off of the polyimide resin anisotropic membrane used. A cross-linkable silicone resin having an average molecular weight of from 10,000 to 200,000, preferably from 30,000 to 80,000 is generally used. The term "average molecular weight" as used herein means a weight average molecular weight as determined by the GPC method.

In the present invention, at least one of the above cross-linkable silicone resins is dissolved in an organic solvent, the organic solution is brought into contact with the surface of the dense layer of the above polyimide resin anisotropic membrane, the organic solvent is removed by evaporation, and the cross-linkable silicone resin is insolubilized by causing hydrolysis at room temperature under the action of moisture in the air followed by a three dimensional cross-linking reaction, whereby a thin film of the cross-linked silicone resin is formed on the surface of the dense layer of the polyimide resin anisotropic membrane.

Since, in the present invention, all the above-described polyimide resins have superior resistance against organic solvents, organic solvents which can be used in the preparation of the organic solution of the cross-linkable silicone resin are not limited. A suitable organic solvent is chosen depending on the type of the resin. For example, aliphatic hydrocarbon solvents, aromatic hydrocarbon solvents, alcohol solvents, carboxylic acid solvents, ester solvents, ketone solvents, ether solvents, halogenated hydrocarbon solvents, and the like are used. In more detail, hexane, heptane, benzene, toluene, xylene, methanol, ethanol, propanol, butanol, acetic acid, acrylic acid, ethyl acetate, butyl acetate, acetone, methyl ethyl ketone, methyl isobutyl ketone, tetrahydrofuran, dioxane, methylene chloride, chloroform, carbon tetrachloride, 1,1,1-trichloroethane, and chlorobenzene can be used alone or in combination with each other. It is to be noted, however, that the present invention is not limited thereto. Particularly preferred examples thereof are ethyl acetate, methyl ethyl ketone and toluene.

To the organic solution prepared by dissolving the cross-linkable silicone resin in the organic solvent can be added catalysts such as tin compounds and titanium compounds for the purpose of accelerating the cross-linking reaction. In addition, additives, pigments, fillers and the like, for example, silica can be added.

It is desirable in the present invention that the concentration of the cross-linkable silicone resin in the organic solution be relatively low. The concentration of the resin is usually from 0.01 to 10% by weight and preferably from 0.1 to 5% by weight. If the resin concentration is less than 0.01% by weight, defects such as pinholes tend to be formed in the thin film formed. On the other hand, if it is larger than 10% by weight, the thickness of the resulting thin film is too large and, as a result, the permeation flux is too small, which is unsuitable for practical use.

The organic solution can be contacted with the surface of the dense layer of the anisotropic membrane in any suitable manner such as by a dip coating method and a spin coating method (a coating method utilizing a centrifugal force due to a spinner).

After a thin layer of the organic solution is formed on the surface of the dense layer, the organic solvent is removed by evaporation and, thereafter, the cross-linkable silicone resin is cross-linked to form a cross-linked silicone resin thin film having a three dimensional net-like structure. In the process of the present invention, when a specific cross-linkable silicone resin of the above formula (a) is used, the above cross-linking reaction is caused sufficiently satisfactorily by moisture in the air at room temperature and no special cross-linking agent or heating is needed. However, for the purpose of accelerating the cross-linking reaction, if necessary, a heat treatment may be applied.

The thickness of the thin film of the cross-linked silicone resin formed on the surface of the dense layer of the polyimide resin anisotropic membrane is usually from 10 to 5,000 Å and preferably from 100 to 2,000 Å, although it varies depending on the concentration of the resin solution and the thickness of the thin layer of the solution formed on the dense layer. If the thickness of the thin film is too small, defects tend to be formed in the film. On the other hand, if it is too large, the liquid or gas permeation flux is reduced to such an extent that the membrane is unsuitable for practical use.

In another embodiment of the present invention, it is preferred to irradiate the composite membrane with electromagnetic waves, thereby increasing the cross-linking density thereof.

The above electromatic wave is not critical and, for example, radiations such as electron rays, neutron rays, α-rays, β-rays or γ-rays, and ultraviolet rays can be applied. The dose of the radiation is usually from 1 to 50 Mrad and preferably from 3 to 20 Mrad, although it varies depending on the atmosphere in which the radiation is applied, and the temperature.

When the above composite membrane is irradiated with such electromagnetic waves, a radical molecule is formed in the side chain of polyorganosiloxane of the formula (a) which constitutes the thin film and the radical molecule participates in the cross-linking reaction, thereby increasing the cross-linking density. Thus, a composite membrane having excellent mechanical strength, resistance against organic solvents, selective permeability, and so forth can be obtained.

In accordance with the present invention, the polyimide resin anisotropic membrane is used as a substrate for the composite membrane and, at the same time, a specific cross-linkable silicone resin is used. Therefore, a very thin and insoluble cross-linked silicone resin thin film can be formed on the dense layer of the polyimide resin anisotropic membrane at room temperature without application of any special heating, and the thus-obtained composite membrane has excellent properties such as mechanical strength, resistance against organic solvents, and selective permeability. As a result, the composite membrane is suitable for use in separation of various organic solvents and gases.

The composite membrane of the present invention is effective particularly in removing solutes having a low molecular weight of from several tens to several thousands. For example, the composite membrane is suitable for use in concentration and separation of organic solutions containing low molecular weight solutes, which is in the intermediate region between reverse osmosis and ultrafiltration and is difficult to achieve by membrane separation, or the pervaporation method to separate an organic component such as methanol, ethanol, propanol or acetone from an aqueous solution containing the organic constituent, or separation of a gas mixture.

The composite membrane of the present invention, however, is not limited in its application. As a matter of course, the composite membrane can be used in separation of an aqueous mixture.

The present invention is described in greater detail with reference ot the following Examples, although it is not limited thereto.

EXAMPLE 1

An N-methyl-2-pyrrolidone solution containing 18% by weight of a polyimide resin (intrinsic viscosity [$\eta$]: 0.91) having a repeating unit:

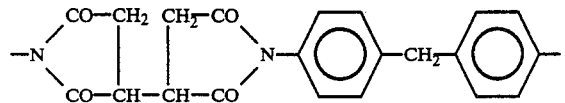

and 22% by weight of diethylene glycol was processed by the conventional phase conversion method described in Japanese Patent Application (OPI) No. 152507/80 to obtain an ultrafiltration membrane having an anisotropic structure having the thickness of 200 $\mu$m and the molecular weight cut-off of 50,000.

The rejection of polyethylene glycol of the ultrafiltration membrane, as determined at a temperature of 20° C. under a pressure of 4 kg/cm$^2$ using an ethanol solution containing 5,000 ppm of polyethylene glycol having an average molecular weight of 1,000 was 1.0%, and the permeation flux was 95 l/m$^2$.hr.

Two parts by weight of polyorganosiloxane (formula (b)) having an average molecular weight of 64,000 was dissolved in 100 parts by weight of toluene to prepare a 2.0% by weight cross-linkable silicone resin solution.

The above ultrafiltration membrane was converted into a glycerin-containing dry membrane. Then, the surface of the dense layer of the ultrafiltration membrane was dipped in the cross-linkable silicone resin solution for about 60 seconds to uniformly coat the cross-linkable silicone resin solution on the surface of the dense layer. After coating, the toluene was evaporated at room temperature, and the membrane was allowed to stand in the air for 24 hours to obtain a composite membrane comprising the polyimide ultrafiltration membrane with the cross-linked silicone resin thin film formed on the dense layer thereof. The thickness of the cross-linked silicone resin thin film observed by electron microscope was about 500 Å.

The composite membrane was measured for membrane performance under the same conditions as above. The rejection of polyethylene glycol was 90.4%, and the permeation flux was 21 l/m$^2$.hr.

EXAMPLE 2

An N-methyl-2-pyrrolidone solution containing 22.3% by weight of a polyimide resin (intrinsic viscosity [$\eta$]: 0.95) having a repeating unit:

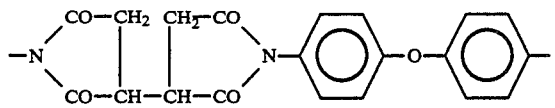

and 22.3% by weight of diethylene glycol was processed in the same manner as in Example 1 to produce an ultrafiltration membrane having a thickness of 220 $\mu$m and a molecular weight cut-off of 20,000.

In 100 parts by weight of ethyl acetate was dissolved 1.8 parts by weight of polyorganosiloxane (formula (c)) having an average molecular weight of 69,000 to prepare a 1.8% by weight cross-linkable silicone resin solution.

The cross-linkable silicone resin solution was uniformly coated on the surface of the dense layer of the ultrafiltration membrane which is a glycerin-containing dry membrane, by dropping it at room temperature using a spinner (1,200 rpm). Immediately after coating, the ethyl acetate was vaporized at room temperature. The membrane was allowed to stand in the air for 24 hours to obtain a composite membrane comprising the polyimide ultrafiltration membrane with an about 200 Å thick cross-linked silicone resin thin film formed on the surface of the dense layer thereof.

As shown in the Figure, the above-obtained composite membrane 4 (effective membrane area: 30.2 cm$^2$) was fitted to an opening of a container 3 with a liquid inlet 1 and a liquid outlet 2. The composite membrane was supported by a porous sintered metal plate 5, and an evacuation chamber 6 at the side of the metallic plate was evacuated. A liquid of water and ethanol (50:50 by weight) was introduced through the liquid inlet 1 and withdrawn through the outlet 2. In this manner the liquid was recycled. The evacuation chamber 6 was evacuated to 20 mmHg by means of a vacuum pump. Between the evacuation chamber 6 and the vacuum pump was provided a liquid nitrogen cooling trap where a permeated gas was liquefied and the membrane permeated liquid was collected.

The permeated liquid was composed of 8% by weight water and 92% by weight ethanol, and the permeation flux was 9.8 l/m$^2$.hr.

EXAMPLE 3

A composite membrane with about 1,000 Å thick cross-linked silicone resin thin film formed thereon was produced in the same manner as in Example 2.

Oxygen and nitrogen permeation fluxes ($cm^3(STP)/cm^2\cdot sec\cdot cmHg$) of the membrane were measured at 25° C. by the high vacuum method and found to be $1.5\times10^{-3}$ and $6.8\times10^{-4}$, respectively. The oxygen separation coefficient, $\alpha$, as calculated by dividing the oxygen permeation flux by the nitrogen permeation flux, was 2.2.

EXAMPLE 4

A composite membrane with about 1500 Å thick cross-linked silicone resin thin film formed thereon was produced in the same manner as in Example 2.

This composite membrane was irradiated with electron rays at a dose of 10 Mrad in a nitrogen atmosphere at room temperature by means of an electron ray-emitting apparatus (Model CB-150 ELECTROCURTAIN produced by ESI Co., Ltd.).

The composite membrane was measured for membrane performance under the same conditions as in Example 1. The rejection of polyethylene glycol was 95.3% and the permeation flux was 15 $l/m^2\cdot hr$.

The composite membrane was fitted to the apparatus used in Example 2, and a liquid of water and ethanol (50:50 by weight) was treated. The permeated liquid was composed of 5% by weight water and 95% by weight ethanol, and the permeation flux was 6.8 $l/m^2\cdot hr$.

EXAMPLE 5

A composite membrane with about 1200 Å thick cross-linked silicone resin thin film formed thereon was produced in the same manner as in Example 2.

This composite membrane was irradiated with electron rays at a dose of 20 Mrad in the same manner as in Example 4. Oxygen and nitrogen permeation fluxes ($cm^3(STP)/cm^2\cdot sec\cdot cmHg$) and separation coefficient $\alpha$ of the composite membrane were measured by the same method as in Example 3 and found to be $1.9\times10^{-3}$, $7.6\times10^{-4}$, and 2.5, respectively.

While the invention has been described in detail and with reference to specific embodiments thereof, it will be apparent to one skilled in the art that various changes and modifications can be made therein without departing from the spirit and scope thereof.

What is claimed is:

1. A process for producing a composite membrane which comprises:

bringing an organic solution of a cross-linkable silicone resin represented by the formula:

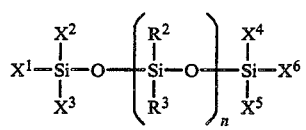

wherein $X^1$, $X^2$, $X^3$, $X^4$, $X^5$ and $X^6$ each is a monovalent organic group, with the proviso that at least three groups thereof present at both ends of the molecule each is a reactive group selected from the group consisting of an acyloxy group, an alkoxy group, a ketoxime group, an alkyl-substituted amino group and an amide group, $R^2$ and $R^3$ each is an organic group selected from the group consisting of an alkyl group, a halogenated alkyl group, a vinyl group and an aryl group, and n is an integer of from 400 to 1,000, into contact with the surface of a dense layer of an anisotropic membrane made of a polyimide resin comprising a dense surface layer and a porous layer continuously connected to the dense surface layer, said polyimide resin consisting essentially of a repeating unit represented by the formula:

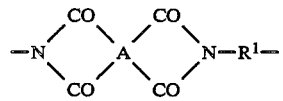

wherein A is a tetravalent aliphatic or aromatic group, and $R^1$ is a divalent aromatic, alicyclic or aliphatic hydrocarbon group, or a divalent organic group comprising the hydrocarbon groups linked together through a divalent organic linking group, and cross-linking the silicon resin to form a cross-linked silicone resin thin film on the dense surface layer of the anisotropic membrane, wherein the average molecular weight of the cross-linkable silicone resin is equivalent to or greater than the molecular cut-off of the polyimide resin anisotropic membrane and wherein the cross-linkable silicone resin is cross-linkable at room temperature.

2. The process as claimed in claim 1, wherein the polyimide resin anisotropic membrane has a molecular weight cut-off of from 1,000 to 100,000.

3. The process as claimed in claim 1, wherein the concentration of the cross-linkable silicone resin in the solution is from 0.01 to 10% by weight.

4. The process as claimed in claim 1, which further comprises the step of irradiating the cross-linked silicone resin thin film with electromagnetic waves to increase the cross-linking density.

5. The process as claimed in claim 4, wherein the dose of the irradiation is from 1 to 50 Mrad.

6. The process as claimed in claim 1, wherein cross-linking of the silicone resin is caused by moisture in the air at room temperature.

7. The process as claimed in claim 6, wherein in the polyimide resin represented by said formula $R^1$ is a divalent aromatic hydrocarbon group or a divalent aromatic group comprising at least two aromatic hydrocarbon groups linked together through the divalent organic linking group.

8. The process as claimed in claim 7, wherein the polyimide resin semipermeable membrane has a molecular weight cut-off of from 20,000 to 50,000.

9. The process as claimed in claim 8, wherein the cross-linkable silicone resin has an average molecular weight of from 10,000 to 200,000.

10. The process as claimed in claim 9, wherein the thin film of the cross-linked silicone resin has a thickness of from 10 to 5,000 Å.

11. The process as claimed in claim 6, wherein cross-linking of the silicone resin is conducted in the absence of a cross-linking agent or heating.

* * * * *